(No Model.) 4 Sheets—Sheet 3.
J. A. OSTENBERG.
AUTOMATIC WEIGHING AND PACKING MACHINE.

No. 446,266. Patented Feb. 10, 1891.

WITNESSES:
F. McArdle,
Wm. W. Duyster

INVENTOR:
J. A. Ostenberg
BY Munn & Co.
ATTORNEYS.

(No Model.) 4 Sheets—Sheet 4.
J. A. OSTENBERG.
AUTOMATIC WEIGHING AND PACKING MACHINE.

No. 446,266. Patented Feb. 10, 1891.

WITNESSES:
F. McArdle
Wm W. Duyster

INVENTOR:
J. A. Ostenberg
BY Munn & Co.
ATTORNEYS.

UNITED STATES PATENT OFFICE.

JOHN A. OSTENBERG, OF DES MOINES, IOWA.

AUTOMATIC WEIGHING AND PACKING MACHINE.

SPECIFICATION forming part of Letters Patent No. 446,266, dated February 10, 1891.

Application filed October 19, 1889. Serial No. 327,584. (No model.)

*To all whom it may concern:*

Be it known that I, JOHN A. OSTENBERG, of Des Moines, in the county of Polk and State of Iowa, have invented a new and Improved Automatic Weighing and Packing Machine, of which the following is a specification, reference being had to the accompanying drawings, forming a part thereof, in which—

Figure 1:
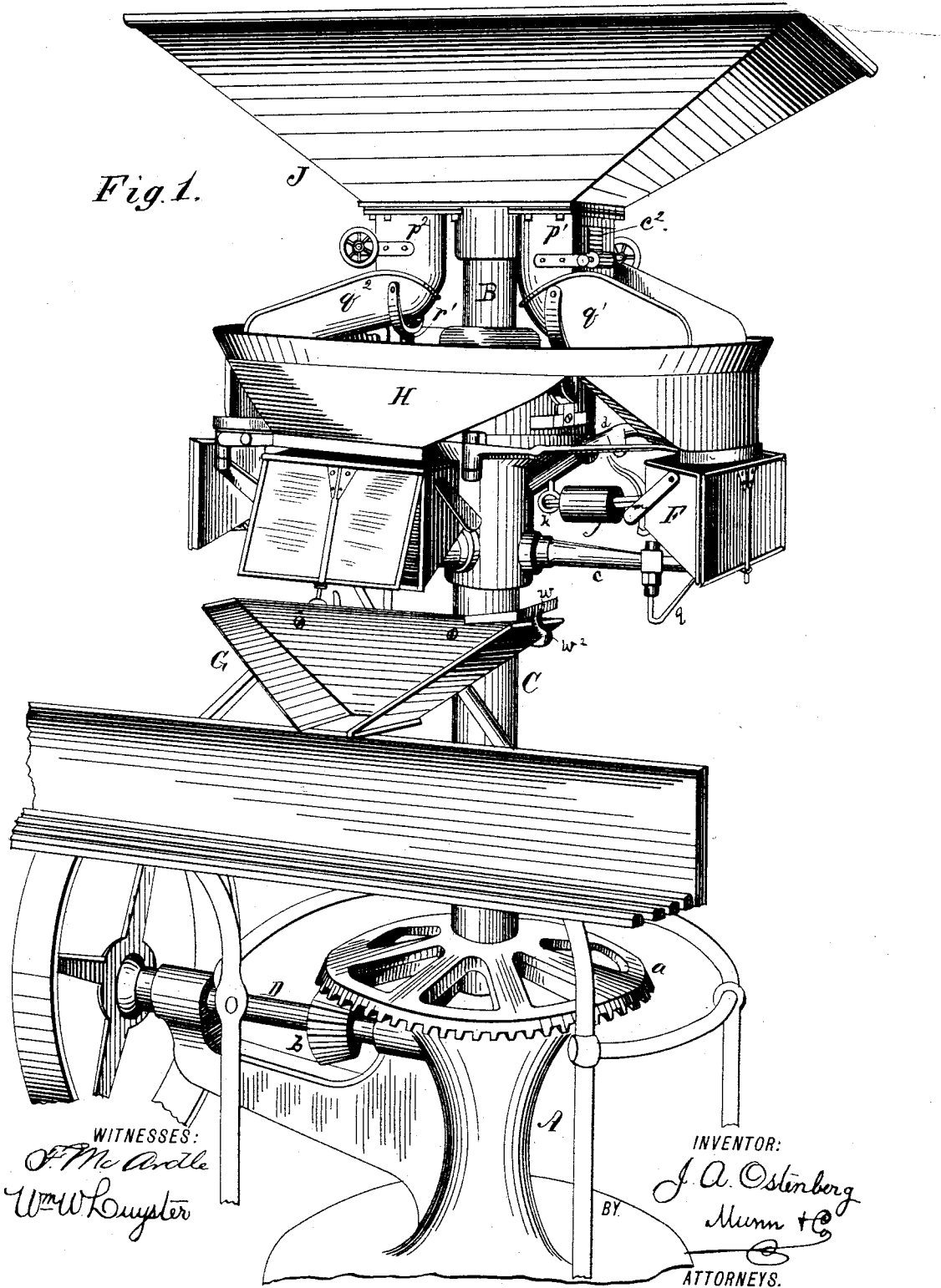
Figure 2:
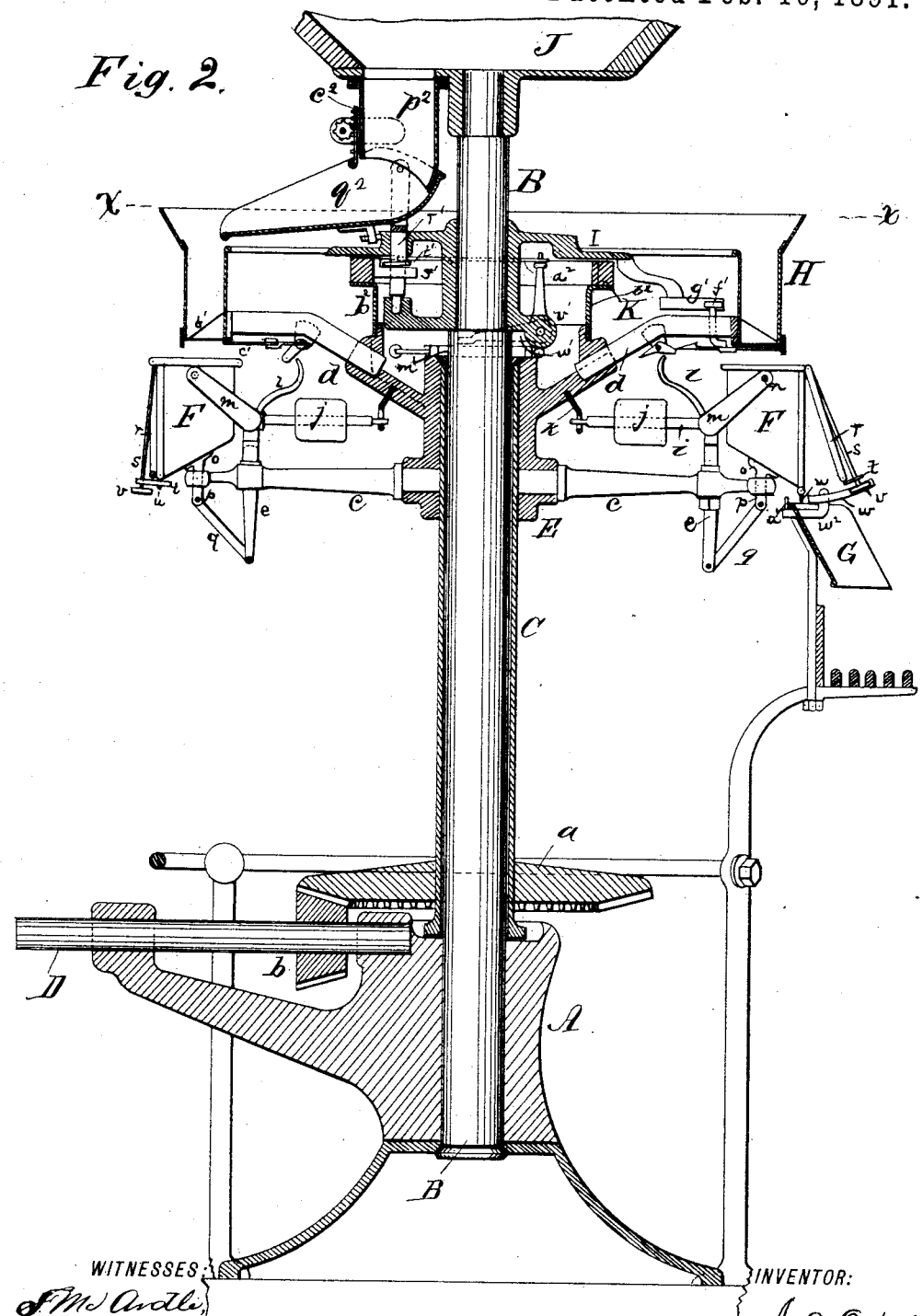
Figure 3:
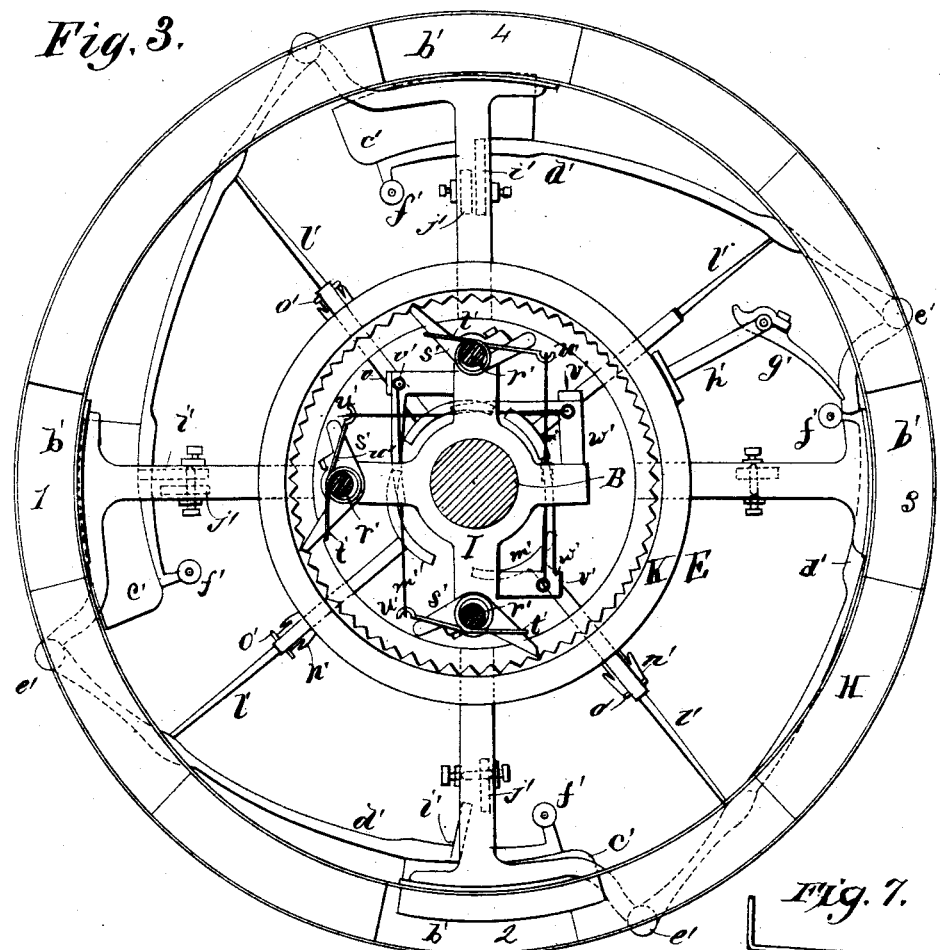
Figure 7:
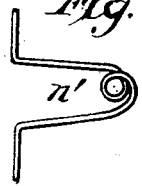
Figure 4:
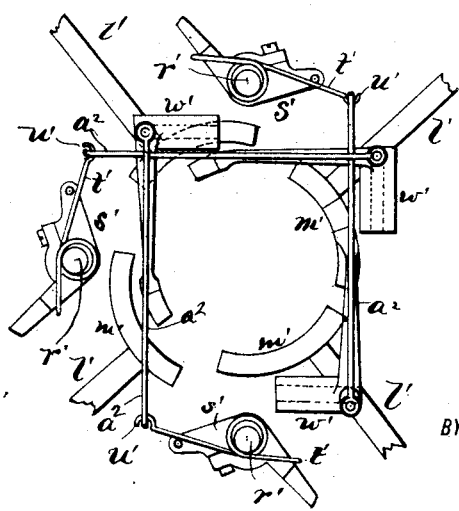
Figure 5:
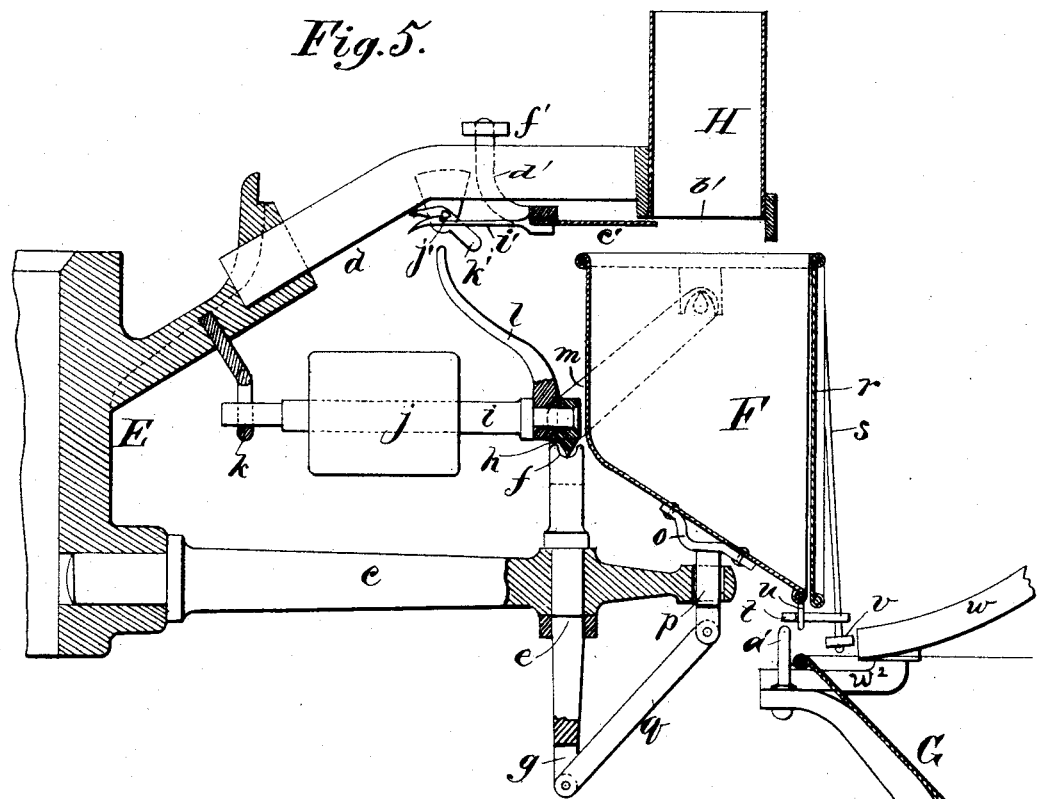
Figure 6:
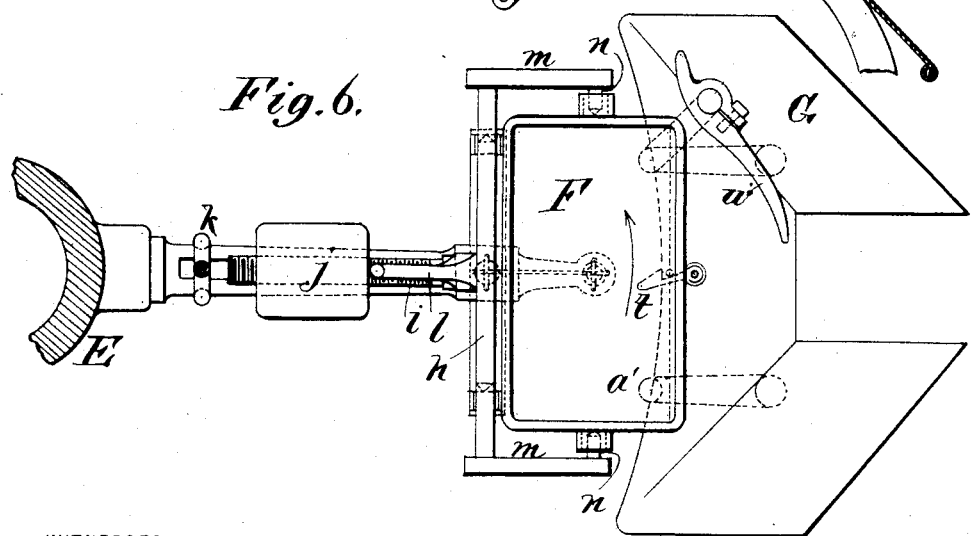

Figure 1 is a perspective view of my improved automatic weighing and packing machine. Fig. 2 is a vertical transverse section. Fig. 3 is a horizontal section taken on line $x$ $x$ in Fig. 2. Fig. 4 is a detail plan view of the shaking mechanism. Fig. 5 is an enlarged sectional view of the weighing-scales and hopper-shutter tripping mechanism. Fig. 6 is a plan view of the same; and Fig. 7 is a side view, on an enlarged scale, of one of the springs $n'$.

Similar letters and figures of reference indicate corresponding parts in all the views.

The object of my invention is to construct a simple and efficient machine for automatically weighing loose material, such as starch, spices, &c., and discharging them into boxes, bags, and other packages.

My invention consists in the combination of a standard, a revoluble sleeve placed on the standard and carrying series of weighing-scales, a circular hopper adapted to discharge into the boxes of the weighing-scales, mechanism for automatically discharging the material to be weighed through shaker-spouts into the boxes of the weighing-scales, and mechanism for shutting off the supply of material when the proper amount has been supplied to the scales, all as will be hereinafter more fully described.

In the base A is inserted a vertical standard B, upon which is placed a sleeve C, and upon the said sleeve is secured a bevel-wheel $a$, which receives motion from a bevel-pinion $b$ on a horizontal shaft D, journaled in the base A. To the sleeve C is attached a casting E, in which are inserted four radial arms $c$, also four arms $d$, which are arranged immediately above the arms $c$. In the end of each arm $c$ is inserted a vertical bar $e$, provided at its upper end with a transverse groove $f$ and at the lower end with a fork $g$. In the transverse groove $f$ rests a V-shaped bar $h$. To the said bar $h$ is attached an arm $i$, carrying a weight $j$. The motion of the said arm is limited by an eye $k$, secured to the casting E.

The arm $i$ carries a curved finger $l$, and to the ends of the bar $h$ are attached arms $m$, which extend obliquely upward and are provided with V-shaped studs $n$, which project inwardly and form the support of the scale-box F. To the lower end of the scale-box F is attached an angled plate $o$, to which is secured a forked rod $p$. In the said forked rod $p$ and in the fork $g$ of the bar $e$ is pivoted a link $q$, parallel with a line drawn through the edges of the bar $h$ and stud $n$. This arrangement gives the scale-box F a parallel motion, and the inclination of the arm $m$ and the link $q$ insures a quick downward movement when the proper amount of material is contained by the scale-box F, as the leverage of the said arm $m$ is increased as the arm approaches a horizontal position.

The front $r$ of the scale-box F is hinged at the top so that it may swing open at the bottom for the purpose of discharging its contents, and the bottom of the box is inclined to facilitate the discharge. The front $r$ is provided with a spring-bar $s$, carrying a catch $t$, which engages a stud $u$ projecting downwardly from the box F. The lower end of the spring-bar $s$ is provided with a roller $v$, which is adapted to engage the inclined arm $w$ as the box F is carried forward in the manner presently to be described, the said inclined arm $w$ being supported by a rod $w^2$ attached to the chute G. A stud $a'$, attached to the frame of the delivery-table, projects into the path of the catch $t$ and trips the said catch as the box F is moved forward.

The chute G is arranged below the path of the scale-boxes F at the point of discharge, and below the said chute there is a slatted table for supporting the boxes or packages into which the contents of the scale-boxes F are to be discharged.

The ends of the arms $d$ carry an annular hopper H, which is divided into four divisions 1 2 3 4, having sloping sides inclining downward toward the discharge-opening $b'$, which opening $b'$ is closed by a shutter $c'$, attached to an arm $d'$ pivoted on a stud $e'$, projecting from the end of the arm $d$, as clearly shown in Fig. 3. Each arm $d'$ carries a roller $f'$, which is adapted to be engaged by a cam $g'$, held in the path of the roller by an arm $h'$, projecting from a fixed part of the machine. The said cam is arranged relative to the discharge-chute G so that it opens the shutter $c'$ immediately after the discharge and closing of the scale-box F, thus giving the scale-box time to fill. Each arm $d'$ is provided with a spring-catch $i'$, which engages a V-shaped bar $j'$, pivoted in ears projecting from the arm $d$. The said catch $i'$ thus holds the shutter $c'$ open.

To the V-shaped bar $j'$ is attached an arm $k'$, which projects into the path of the finger $l$ on the arm $i$. The arms $d'$ are pressed outwardly by spring-pressed rods $l'$, which carry at their inner ends curved bars $m'$, the entire series of which form a complete circle when pushed in to their limit. The springs $n'$, which push the said rods $l'$ outwardly, are of the form shown in Fig. 7, and they abut against the casting E and are attached to cross-pins $o'$, passing through the rods $l'$, as clearly shown in Fig. 3.

A spider I is attached to the vertical standard B, above the casting E, and to the top of the said vertical standard B is secured a hopper J for receiving the material to be weighed and packed. The said hopper J is provided with a large discharge-spout $p'$ and two smaller ones $p^2$, one of which is not shown. Below these spouts are arranged shaker-spouts $q'$ $q^2$, the said spouts being supported upon vertical shafts $r'$, journaled in the arms of the spider I. Upon the lower ends of the said vertical shafts $r'$ are attached angled levers $s'$, which carry springs $t'$, the said springs being attached at one end to the lever coiled around the shafts $r'$, and provided at their free ends with hooks $u'$.

On studs $v'$ projecting from the spider I are pivoted the right-angled levers $w'$, the horizontal arms of which project over the path of the curved bars $m'$ when the said bars are in their inner position. The vertical arms of the said levers $w'$ are connected by rods $a^2$ with the hooks $u'$ on the springs $t'$.

A ring K, provided with internal triangular teeth, is supported by a metallic hoop $b^2$, fitted to the casting E, and when the curved bars $m'$ are pushed inward by the movement of the arms $d'$ they lift the longer arms of the right-angled levers $w'$, and thus throw the angled levers $s'$ into engagement with the triangular teeth on the interior of the ring K. The said levers $s'$ in passing over the teeth cause the vertical shafts $r'$ to oscillate and thus to shake the spouts $q'$ $q^2$. The delivery-spouts $p'$ $p^2$ of the hopper J are provided with gates $c^2$, which in the present case are operated by a rack-and-pinion movement to control the flow of the material to the spouts.

The operation of my improved automatic weighing and packing machine is as follows: After the scale-box F has passed the chute G the roller $f'$ strikes the cam $g'$, opening the shutter $c'$, which is caught by the engagement of the catch $i'$ with the triangular bar $j'$. The scale-box F, with its corresponding division of the annular hopper H, passing under the large shaker-spout $q'$, the curved bar $m'$, connected with the rod $l'$, attached to the shutter-operating arm, lifts the right-angled lever $w'$, bringing the shaker-spout $q'$ into operation during one-quarter of a revolution of the machine. The material fed through the spout $q'$ is caught by the division of the annular hopper H and flows into the scale-box F. The scale-box F, containing a little less material than the weight desired, now passes under the small shaker-spouts $q'$ $q^2$, and bringing these into operation through the above-described mechanism receives a small and even supply until it drops when the finger $l$ strikes the lever $k'$, disengaging the catch $i'$, allowing the spring $n'$ to close the shutter $c'$, thus arresting any material that may be in transit between the shaker-spout and scale-box. When the shutter $c'$ closes, the curved bar $m'$ is drawn outward, allowing the lever $w'$ to fall, bringing the shaker-spout then feeding the scale to a stop. When the scale-box F in its rotation reaches the chute G, the catch $t$ strikes the pin $a'$ and releases the front of the box, allowing the contents of the box to escape into the chute, whence they pass to the box or package placed under the said chute upon the slatted table. Should the scale-box fail to fill, the catch $t$ will not be carried down so as to be engaged by the pin $a'$, and as a consequence the contents of the scale-box will not be disturbed until it is completely filled during another revolution, as the catch $t$ cannot come into engagement with the pin $a'$ until after the scale-box F has dropped to its lowest limit. The operation is repeated with each of the scale-boxes and with each revolution of the machine.

Having thus described my invention, I claim as new and desire to secure by Letters Patent—

1. In an automatic weighing and packing machine, the combination of a quick-closing feed-controlling shutter and feed-spout, shaking mechanism connected with the shutter and adapted to shake the spout while the shutter is opened, a circular traveling scale-box provided with a discharge-door, and means, substantially as described, for automatically opening and closing the said door and for moving the scale-box in a circular path.

2. In an automatic weighing and packing machine, the combination of the arm $c$, the bar $e$, the bar $h$, provided with arms $m$, the weighted arm $i$, the circular traveling scale-box F, provided with an inclined bottom and hinged side $r$, the bar $p$, the link $q$, and means for moving the scale-box in a circular path, substantially as specified.

3. The combination, with the circular traveling scale-box F, provided with the hinged side $r$, of the bar $s$, the catch $t$, attached to the said bar, the stud $u$ for engagement with the said catch $t$, the stud $a'$ for disengaging the catch, and means, substantially as described, for closing and fastening the hinged side $r$ and for carrying the scale-box in a circular path.

4. In an automatic weighing and packing machine, the combination of the circular traveling scale-box F, provided with the hinged side $r$, the rod $s$, the catch $t$ and roller $v$, carried by the said rod, and the cam $g'$, supported in the path of the roller $f'$, substantially as specified.

5. In an automatic weighing and packing machine, the combination of the scale provided with the circular traveling box F, the hopper H, arranged to discharge into the scale-box, the shutter $c'$, the arm $d'$, attached to the shutter and provided with the roller $f'$, and the cam $g'$, substantially as specified.

6. The combination, with the shutter-carrying lever $d'$ and the scale arm $i$, of the spring-catch $i'$, the triangular bar $j'$, provided with the arm $k'$, and the finger $l$, attached to the scale-arm and adapted to trip the catch $i'$, substantially as specified.

7. The combination, with the feeding-spouts $q'\ q^2$, of shaking mechanism consisting of the rock-shafts $r'$, angled levers $s'$, the notched rim K, and controlling mechanism, substantially as specified.

8. In an automatic weighing and packing machine, the combination of the toothed ring K, the angled levers $s'$, the shafts $r'$, the shaking-spouts $q'\ q^2$, and means, substantially as described, for bringing the angled levers $s'$ into engagement with the toothed ring.

9. In an automatic weighing and packing machine, the combination, with the shaking-spouts $q'\ q^2$, of the shafts $r'$, the levers $s'$, springs $t'$, placed on the shafts $r'$, the angled levers $w'$, connecting-rods $a^2$, curved bars $m'$, rods $l'$, the arms $d'$, provided with rollers $f'$, and the cams $g'$, substantially as specified.

JOHN A. OSTENBERG.

Witnesses:
 W. M. NEWELL,
 JOHN G. O'BRIEN.